June 1, 1971 A. LEDERGERBER 3,581,358
TOOL SUPPORTING ASSEMBLY
Filed May 23, 1969
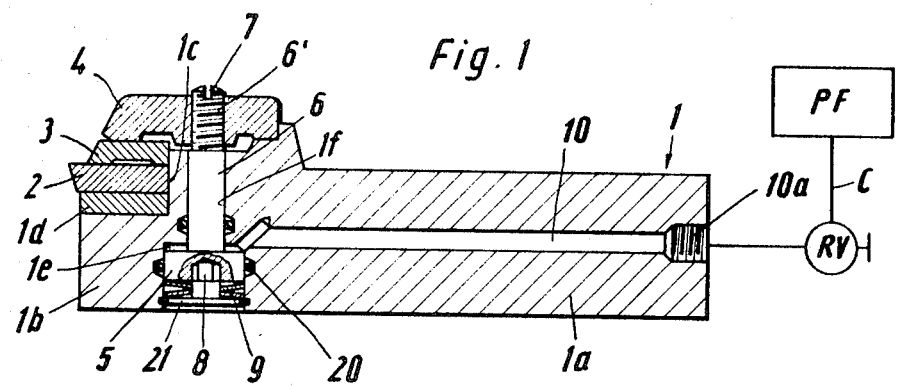
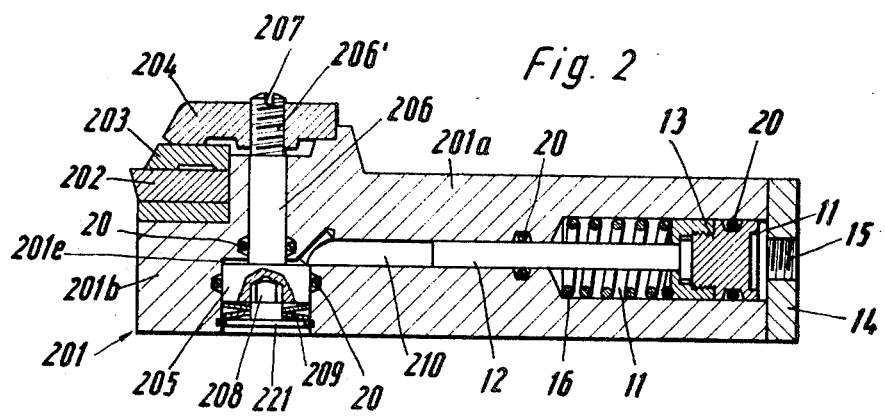
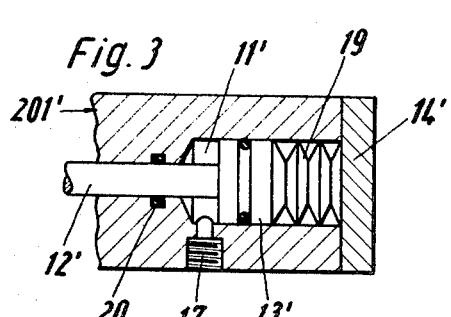
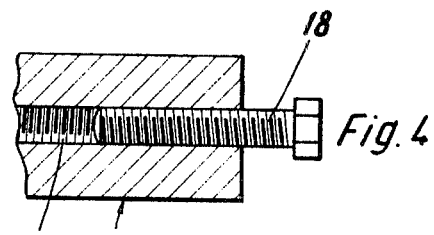
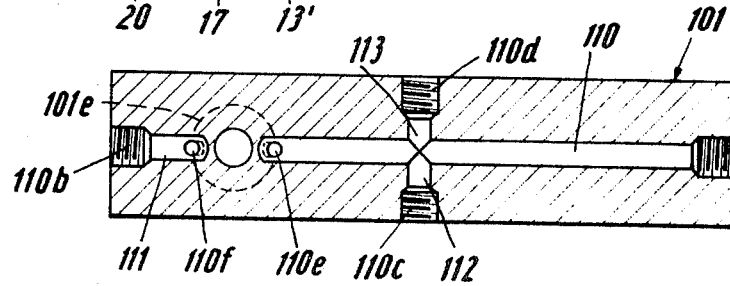
Inventor:
Alfred Ledergerber
by *[signature]*
his Attorney United States Patent Office 3,581,358
Patented June 1, 1971

3,581,358
TOOL SUPPORTING ASSEMBLY
Alfred Ledergerber, Bielefeld, Germany, assignor to Werkzeugmaschinenfabrik Gildemeister & Comp. Akt.-Ges. am Hauptbahnhof, Bielefeld, Germany
Filed May 23, 1969, Ser. No. 827,406
Int. Cl. B26d 1/12
U.S. Cl. 29—96                                          12 Claims

ABSTRACT OF THE DISCLOSURE

A tool supporting assembly which can be secured to the turret or carriage of a machine tool to support a turning, milling or other material removing tool comprises a tool holder defining a cylinder chamber for a piston which is adjustably connected with a movable clamping device cooperating with a portion of the tool holder to either hold or release a tool. The piston is permanently biased to releasing position but cooperates with the tool holder to effect retention of the tool in requisite position in response to admission of a hydraulic or pneumatic fluid into the cylinder chamber. The fluid can be admitted by a two-stage piston, by a screw or by a valve which is installed in a conduit connecting a bore of the tool holder with a source of pressurized fluid.

BACKGROUND OF THE INVENTION

The present invention relates to tool supporting assemblies, particualrly to improvements in assemblies of the type comprising a tool holder and a device which clamps a material removing tool to the tool holder so that the latter can properly support the tool on the turret or carriage of a machine tool.

German Pats. Nos. 1,217,741 and 1,251,130 disclose tool supporting assemblies wherein a plate-like clamping member is coupled to the tool holder by a screw which must be rotated in order to clamp or release the tool which is placed between the tool holder and the clamping member and is normally accommodated in a recess of the tool holder. A drawback of such tool supporting assemblies is that the screw which couples the clamping member to the tool holder must be accessible at all times, i.e., even when the tool is moved into or close to engagement with a workpiece. Thus, the person in charge must be in a position to reach the screw with a wrench, a screwdriver or a like implement in order to effect adjustment, replacement or inversion of the tool. As a rule, such work necessitates temporary stoppage of the machine tool and withdrawal of the carriage or turret to a retracted position so that the screwdriver or wrench can safely reach the screw without any danger to the operator. Loosening and subsequent tightening of the screw consumes much time which is particularly felt when the tool supporting assembly is installed in an automatic machine tool. Repeated loosening and tightening of the screw, coupled with withdrawal of the tool supporting assembly from the working station, causes substantial losses in the output of an automatic or semiautomatic machine.

SUMMARY OF THE INVENTION

An object of the invention is to provide a tool supporting assembly for turning, milling or other tools which can be installed, for example, in the turret, slide or carriage of a machine tool to releasably hold a material removing tool in an optimum position for engagement with a workpiece in a novel and improved way.

Another object of the invention is to provide novel displacing means for the movable clamping device of a tool supporting assembly for use in machine tools.

A further object of the invention is to provide a tool supporting assembly which can release and/or engage a material removing tool by remote control.

An additional object of the invention is to provide an assembly which is capable of releasing the tool in any desired position with reference to the parts of an automatic or semiautomatic machine tool.

A concomitant object of the invention is to provide an assembly which permits more convenient, more rapid and safer replacement, inspection, adjustment and/or inversion of a cutting, milling, turning or other tool than the presently known tool supporting assemblies.

The improved tool supporting assembly comprises a tool holder, a first clamping device provided on and preferably forming a separable or integral part of the tool holder, a second clamping device which defines with the first device a tool-accommodating space and is movable with reference to the first device between first and second positions to thereby respectively hold and release a tool in the aforementioned space, and novel displacing means serving to move the second clamping device and including a cylinder member and a piston member reciprocably received in the cylinder member. One of these members is movable with the second clamping device and the displacing means further comprises operating means for effecting the flow of a hydraulic or pneumatic (preferably hydraulic) fluid medium into and from the cylinder member to thereby move the one member and the second clamping device with reference to the first clamping device. The one member is preferably the piston member and the latter is then preferably connected to the second clamping device through the intermediary of its piston rod in such a way that the operator can adjust the distance between the piston of the piston member and the second clamping device, either by rotating the piston member by way of the piston rod or by rotating the piston member by way of its piston. A package of dished springs or other suitable biasing means preferably forms part of the displacing means and serves to permanently bias the second clamping device to second position, i.e., the clamping devices cooperate to hold the tool in requisite position when the cylinder member receives pressurized fluid.

The novel features which are considered as characteristic of the invention are set forth in particular in the appended claims. The improved tool supporting assembly itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a longitudinal sectional view of a tool supporting assembly which embodies one form of the invention;

FIG. 2 is a longitudinal sectional view of a second tool supporting assembly;

FIG. 3 is a fragmentary longitudinal sectional view of a tool supporting assembly which constitutes a modification of the assembly shown in FIG. 2;

FIG. 4 is a fragmentary longitudinal sectional view of a further tool supporting assembly; and FIG. 5 is a sectional view of a modified tool holder which can be utilized in the assembly of FIG. 1.

DESCRIPTION OF THE PREFERRED EMBODIMENTS

Referring to FIG. 1, there is shown a tool supporting assembly which includes a tool holder 1 having an extension or shank 1a and a cylinder member or head 1b and adapted to be mounted in the slide, carriage or turret of a machine tool, not shown. The head 1b is formed with a notch 1c which receives a plate-like clamping device 1d and a deflector 3 for shavings. The clamping device 1d is preferably rigid with and can be considered as forming part of the tool holder 1. A material removing tool or cutter 2 is removably accommodated in the space between the clamping device 1d and deflector 3. The means for holding the tool 2 in requisite position when the tool supporting assembly is in use comprises a second plate-like clamping device 4 which overlies the deflector 3 and can be moved toward the tool 2 so that the latter is safely held between the clamping device 1d and deflector 3. The clamping device 4 has a tapped bore which accommodates the externally threaded pirtion 6' of a piston rod 6 which is rigid with a piston 5 reciprocable in a chamber 1e of the cylinder member or head 1b. The outer end of the threaded portion 6' has a diametral slot 7 which can receive the working end of a screwdriver or the like so that a person in charge can select the optimum distance between the piston 5 and clamping device 4. The chamber 1e has a smaller-diameter extension 1f which receives the main portion of the piston rod 6. That end face of the piston 5 which is turned away from the piston rod 6 is provided with a recess 8 of polygonal outline which is dimensioned to receive the end of a suitable tool which can be employed to rotate the piston member including the parts 5, 6 with reference to the clamping device 4 for the aforedescribed purpose, i.e., to select an optimum distance between the piston 5 and the clamping device 4. The operator will rotate the piston 5 by way of the recess 8 when the slot 7 is not readily accessible, or vice versa.

The piston 5 is permanently biased upwardly, as viewed in FIG. 1, by a set of dished springs 9 which bear against its lower end face and react against a split ring 21 which is recessed into an internal groove of the cylinder member or head 1b. Such internal groove is machined into the surface surrounding the lower part of the chamber 1e. The purpose of the springs 9 is to permanently bias the piston 5 in a direction to disengage the clamping device 4 from the deflector 3, i.e., to permit withdrawal, adjustment or inversion of the tool 2. If desired, the deflector 3 can be rigid with or it can form an integral part of the clamping device 4. It can be said that the clamping device 4 and the deflector 3 together constitute a composite movable clamping device which can engage one side of the properly inserted tool 2 and that a portion of the tool holder 1 and the clamping device 1d constitute a second composite clamping device which cooperates with the first composite clamping device and engages the other side of a properly inserted tool.

The operating or actuating means of the displacing means which serves to move the clamping device 4 to the operative or retaining position shown in FIG. 1 comprises a source PF of pressurized fluid and a regulating valve RV which controls the flow of pressurized fluid (e.g., oil, air or other gaseous or liquid medium) to the chamber 1e by way of an elongated supply bore or channel 10 provided in the shank 1a of the tool holder 1. The right-hand end portion of the bore 10 is formed with internal threads, as at 10a, to permit rapid connection or disconnection of a conduit C which connects the tool holder 1 with the source PF and accommodates the valve RV. The valve RV has at least two positions in one of which it admits pressurized fluid from the source PF to the chamber 1e by way of the bore 10 whereby the fluid moves the piston 5 against the opposition of springs 9 and causes the clamping device 4 to bear against the deflector 3 with a force which suffices to hold the tool 2 in an optimum position while the tool removes material from a workpiece. In another of its positions, the valve RV permits fluid to escape from the chamber 1e by way of the bore 10 so that the springs 9 immediately move the clamping device 4 upwardly, as viewed in FIG. 1, in order to release the tool 2 which is then ready to be removed, inverted or adjusted with reference to the two composite clamping devices 3, 4 and 1d, 1b.

FIG. 5 is a horizontal sectional view of a slightly modified tool holder 101 which is provided with four fluid supplying bores 110, 111, 112, 113 having internally threaded end portions 110a, 110b, 110c, 110d and each adapted to deliver pressurized fluid to the chamber 101e by way of a connecting port 110e (bores 110, 112, 113) or 110f (bore 111). If the bore 110 is more readily accessible for connection of a conduit C (not shown in FIG. 5), the internally threaded outer ends of the bores 111–113 are sealed by means of suitable plugs, not shown. However, if one of the bores 111–113 is more readily accessible than the bore 110, the latter bore is plugged together with two additional bores. It is clear that the bores 110, 111, 112 or 110, 112, 113 or 111, 112, 113, etc. can be omitted if the remaining bore is readily accessible, i.e., the tool holder 100 of FIG. 5 can be provided with a single bore, with two bores, with three bores or with four bores as shown. It is further clear that the bore or bores need not be positioned and distributed in a manner as shown in FIG. 1 or 5.

FIG. 2 illustrates a second tool supporting assembly wherein all such parts which are clearly analogous to the parts of the tool supporting assembly of FIG. 1 are denoted by similar reference numerals plus 200. In this embodiment of my invention, the operating means which effects movements of the piston 205 against the opposition of dished springs 209 comprises a two-stage piston including a smaller diameter portion 12 in the bore 210 of shank 201a and a larger-diameter portion 13 in an enlarged portion 11 of the bore 210. The right-hand end of the larger diameter portion 11 is closed by a plate or lid 14 which is provided with a port 15 for connection with the conduit C (not shown). A helical spring 16 is installed in the portion 11 to react against the shank 201a and to bias the piston portion 13 to the illustrated retracted position in which the piston portion 12 is also retracted and permits the springs 209 to lift the clamping device 204 off the deflector 203. When the port 15 admits a pressurized fluid, the piston portions 12, 13 move in a direction to the left, as viewed in FIG. 2, and the supply of entrapped fluid in the bore 210 and chamber 201e of the cylinder member or shank 201a causes the piston 205 to stress the springs 209 and to maintain the clamping device 204 in operative position. When the pressure of fluid in the port 15 drops to a predetermined value, the springs 209 and 16 are free to expand and thereby return the piston 205 and piston portions 12, 13 to retracted positions so that the tool 202 can be removed, inverted or adjusted. The composite piston 12, 13 serves as a pressure multiplying device which enables a fluid which is admitted at a relatively low pressure via port 15 to displace the piston 205 against the opposition of strong dished springs 209. Thus, the port 15 can receive pressurized fluid directly from a compressed air system or from a pressurized oil system in a machine tool. In such instances, the bore 210 and chamber 201e (above the piston 205) are preferably filled with a fluid of low viscosity, such as Mypolam (trademark). The bore 210 and its extension 11 are drilled in the holder 201 in such a way that the port 15 is readily accessible for connection to a source of pressurized fluid.

FIG. 3 illustrates a portion of a tool supporting assembly which constitutes a modification of the assembly shown in FIG. 2. The spring 16 of FIG. 2 is replaced by a set of dished springs 19 which are installed in the outer part of the extension 11'. The lid 14 is replaced by a lid 14' which does not have a port. The pressurized fluid can enter or leave the front or inner part of the extension 11' by way of a port 17 whereby the thus admitted fluid causes the piston portions 12', 13' to move in a direction to the right and to stress the springs 19. These springs are strong enough to pressurize the fluid which is entrapped in the bore for the piston portion 12' and in the cylinder chamber (not shown) when the port 17 allows fluid to escape from the inner portion of the extension 11'. Thus, admission of pressurized fluid by way of the port 17 results in unclamping of the tool which is mounted in the holder 201'.

In each of FIGS. 1 to 3, the numerals 20 denote sealing elements (preferably O-rings) which are installed in internal grooves to prevent leakage of fluid along the piston rod 6 or 206, piston 5 or 205, piston portion 12 or 12' and piston portion 13 or 13'.

Referring finally to FIG. 4, there is shown a portion of a tool holder 301 having a bore 310 for a supply of entrapped fluid which also fills the chamber of the cylinder member or head (not shown). The operating means comprises a screw 18 which can be rotated by hand or by remote control to thereby pressurize the fluid in the bore 310 and to effect movement of the movable clamping device to operative position. When the screw 18 is rotated in the opposite direction, the springs (not shown) automatically return the piston to a position in which the movable clamping device permits removal, inversion or adjustment of the tool. It is clear that the bore 310 and screw 18 can be provided in another portion of the holder 301 which is more readily accessible than the portion shown in FIG. 4. If desired, the tip of the screw 18 can extend directly into the chamber (corresponding to the chamber 1e of FIG. 1).

Without further analysis, the foregoing will go fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is set forth in the appended claims:

1. A tool supporting assembly comprising a tool holder; a first clamping device on said tool holder; a second clamping device mounted on said tool holder and movable with reference to said first clamping device between first and second positions to thereby respectively hold and release a tool which is placed between said devices; and displacing means for moving said second clamping device and including a cylinder and a piston reciprocably received in said cylinder and having a piston rod including an externally threaded portion mating with an internally threaded portion of said second clamping device, and operating means for effecting flow of fluid medium into and from said cylinder to thereby move said piston and said second clamping device with reference to said first clamping device.

2. A tool supporting assembly as defined in claim 1, wherein said cylinder forms part of said tool holder.

3. A tool supporting assembly as defined in claim 1, wherein said piston is arranged to move said second clamping device to one of said positions in response to admission of fluid medium into said cylinder, and wherein said displacing means further comprises biasing means for permanently urging said second clamping device to the other position.

4. A tool supporting assembly as defined in claim 3, wherein said other position is said second position of said second clamping device.

5. A tool supporting assembly as defined in claim 1, wherein said operating means comprises a multistage piston.

6. A tool supporting assembly as defined in claim 5, wherein said multi-stage piston is movable between first and second positions to thereby respectively admit fluid to said cylinder and permit outflow of fluid from said cylinder, said operating means further comprising resilient means for biasing said multi-stage piston to one of said positions and means for moving said multistage piston to other position by fluid pressure.

7. A tool supporting assembly as defined in claim 6, wherein said one position of said multi-stage piston is said first position thereof.

8. A tool supporting assembly as defined in claim 6, wherein said one position of said multi-stage piston is said second position thereof.

9. A tool supporting assembly as defined in claim 1, wherein said operating means comprises a threaded member which is movable axially to thereby pressurize or reduce the pressure of a fluid medium which is entrapped in said cylinder.

10. A tool supporting assembly as defined in claim 1, wherein said piston rod is provided with means for facilitating its rotation with reference to said second clamping device to thereby vary the distance between said clamping device and said piston.

11. A tool supporting assembly as defined in claim 1, wherein said piston is provided with means for facilitating its rotation to thereby rotate said externally threaded portion and to thus vary the distance between said second clamping device and said piston.

12. A tool supporting assembly as defined in claim 1, wherein said cylinder forms an integral part of said tool holder, said operating means being arranged to effect flow of a fluid medium into and from said cylinder by way of at least one bore provided in said tool holder.

References Cited
UNITED STATES PATENTS
| | | | |
|---|---|---|---|
| 2,706,327 | 4/1955 | Bodin | 29—96 |

FOREIGN PATENTS
| | | | |
|---|---|---|---|
| 246,661 | 8/1963 | Australia | 29—96 |
| 964,725 | 7/1964 | Great Britain | 29—96 |
| 1,124,730 | 8/1968 | Great Britain | 29—105 |
| 318,815 | 2/1920 | Germany | 29—105 |
| 1,170,607 | 5/1964 | Germany | 29—96 |

HARRISON L. HINSON, Primary Examier